(12) United States Patent
Crawford et al.

(10) Patent No.: US 7,010,671 B2
(45) Date of Patent: Mar. 7, 2006

(54) COMPUTER SYSTEM AND METHOD FOR EXECUTING INTERRUPT INSTRUCTIONS IN TWO OPERATING MODES

(75) Inventors: John H. Crawford, Santa Clara, CA (US); Donald Alpert, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 10/094,498

(22) Filed: Mar. 7, 2002

(65) Prior Publication Data

US 2002/0120434 A1 Aug. 29, 2002

Related U.S. Application Data

(63) Continuation of application No. 08/919,570, filed on Aug. 29, 1997, now Pat. No. 6,385,718, which is a continuation of application No. 08/534,305, filed on Sep. 27, 1995, now abandoned, which is a continuation of application No. 08/229,052, filed on Apr. 18, 1994, now abandoned, which is a continuation of application No. 07/763,989, filed on Sep. 23, 1991, now abandoned.

(51) Int. Cl.
*G06F 9/48* (2006.01)
*G06F 13/24* (2006.01)

(52) U.S. Cl. .................. 712/227; 712/244; 710/261; 710/266; 710/269

(58) Field of Classification Search ............... 703/26, 703/27, 23; 712/229, 244, 209, 227; 709/107; 710/261, 269, 266, 265, 262

See application file for complete search history.

(56) References Cited

U.S. PATENT DOCUMENTS

| 4,580,240 A | 4/1986 | Watanabe |
| 4,739,475 A | 4/1988 | Mensch, Jr. |
| 4,812,975 A | 3/1989 | Adachi et al. |
| 4,876,639 A | * 10/1989 | Mensch, Jr. .................. 703/27 |
| 4,926,322 A | 5/1990 | Stimac et al. |
| 4,928,237 A | 5/1990 | Bealkowski et al. |
| 5,003,466 A | 3/1991 | Schan, Jr. et al. |
| 5,018,062 A | 5/1991 | Culler et al. |

(Continued)

FOREIGN PATENT DOCUMENTS

| EP | 297339 A2 | 1/1989 |
| EP | 534597 A3 | 3/1993 |

OTHER PUBLICATIONS

Turley, J.L., *Adv. 80386 Programming Techniques*, Osborne McGraw Hill, 1988, ch. 5, pp. 169–197 and ch. 9, pp. 283–315.

Purkiser, C., "Intel's 386 Unites Unix and DOS Software," Mini Micro Systems, Apr. 1987, pp. 113–120.

*Primary Examiner*—Daniel H. Pan
(74) *Attorney, Agent, or Firm*—Blakely, Sokoloff, Taylor & Zafman LLP

(57) ABSTRACT

A computer system is disclosed herein including a given microprocessor specifically designed to operate in a virtual operating mode that allows a software program previously written for an earlier designed single program microprocessor to execute in a protected, paged, multi-tasking environment under a particularly designed host operating software program. The system also includes means for executing software interrupt (INTn) instructions, using emulation software forming part of the host program in order to emulate the way in which these instructions would have been executed by the earlier microprocessor. As a unique improvement to this overall computer system, certain ones of the INTn instructions are executed by means of emulation software while others are executed by means of the previously written program in cooperation with the given microprocessor and its host operating software program.

22 Claims, 3 Drawing Sheets

U.S. PATENT DOCUMENTS

| | | | |
|---|---|---|---|
| 5,027,273 A | * | 6/1991 | Letwin ........................ 709/107 |
| 5,088,033 A | | 2/1992 | Binkley et al. |
| 5,109,329 A | | 4/1992 | Strelioff |
| 5,117,488 A | | 5/1992 | Noguchi et al. |
| 5,125,087 A | | 6/1992 | Randall |
| 5,132,971 A | | 7/1992 | Oguma et al. |
| 5,282,269 A | | 1/1994 | Willems et al. |
| 5,392,408 A | | 2/1995 | Fitch |
| 5,406,644 A | * | 4/1995 | MacGregor .................. 703/23 |
| 5,432,935 A | | 7/1995 | Kato et al. |
| 6,385,718 B1 | * | 5/2002 | Crawford et al. ........... 712/227 |

* cited by examiner

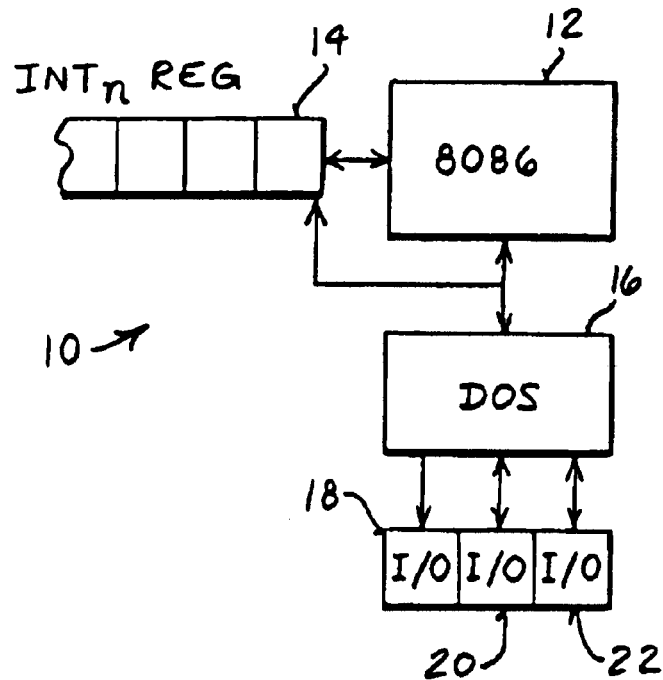
FIG_1
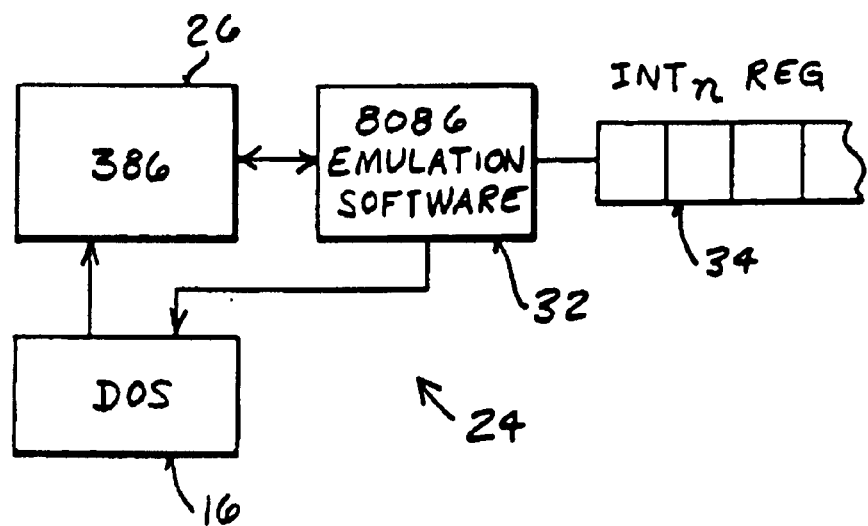
FIG_2

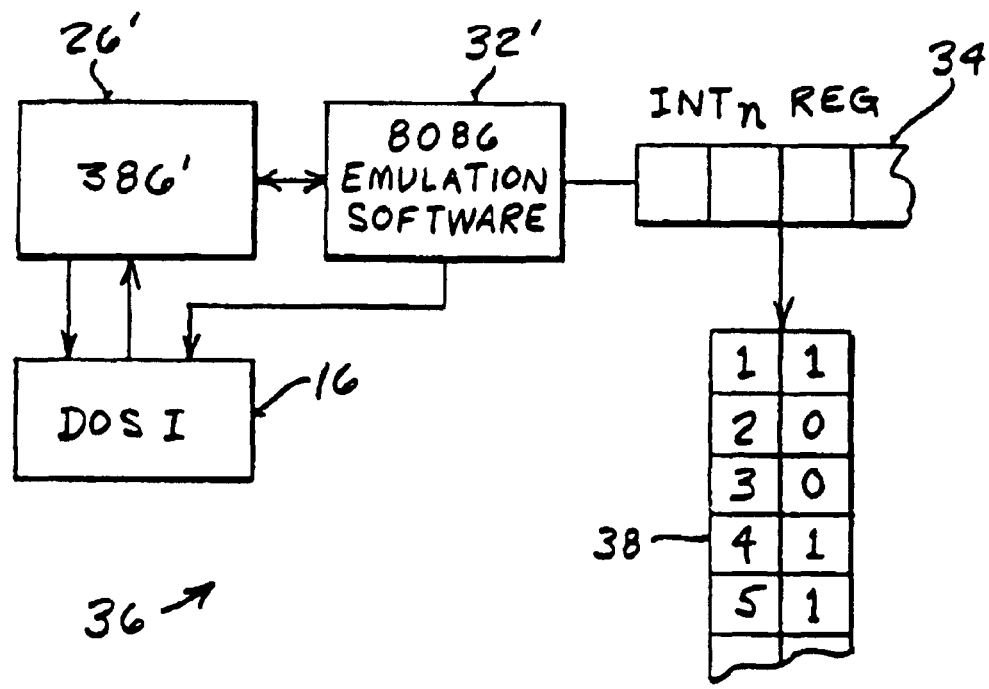

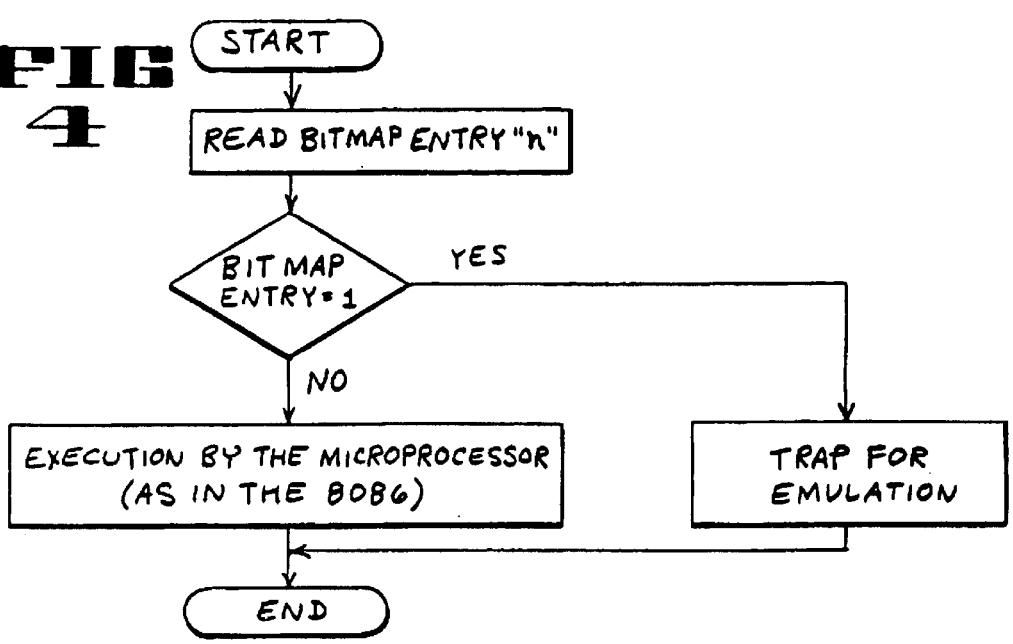

COMPUTER SYSTEM AND METHOD FOR EXECUTING INTERRUPT INSTRUCTIONS IN TWO OPERATING MODES

This application is a Continuation of Prior application Ser. No. 08/919,570 filed Aug. 29, 1997, now U.S. Pat. No. 6,385,718, which is a continuation of prior application Ser. No. 08/534,305 filed Sep. 27, 1995, now abandoned, which is a continuation of prior application Ser. No. 08/229,052 filed Apr. 18, 1994, which is a continuation of Ser. No. 07/763,989 filed Sep. 23, 1991 now abandoned.

FIELD OF THE INVENTION

The present invention relates generally to a computer system including a given microprocessor specifically designed to operate in a virtual operating mode that allows a software program previously written for an earlier designed single programmed microprocessor to execute in a protected, paged, multi-tasking environment under a particularly designed host operating software program. The present invention relates more particularly to an improvement in the way in which the given microprocessor and its host operating software program handle software interrupt instructions (INTn instructions) using emulation software forming part of the host program in order to emulate the way in which those instructions would have been executed by the earlier microprocessor.

BACKGROUND OF THE INVENTION

In the discussion immediately above, reference was made to a given microprocessor, to a previously written software program, to an earlier designed single program microprocessor, and to a particularly designed host operating software program. In the actual practice of the present invention, the given microprocessor specifically refers to an improvement to Intel Corporation's 80386 and 80486™ microprocessor, hereinafter merely referred to as the 386 microprocessor since the invention is equally applicable to both. The earlier designed single programmed microprocessor refers to Intel Corporation's earlier designed single program 8086 microprocessor. The previously written software program refers to any of a number of different programs including specifically DOS programs that were previously written for the 8086 microprocessor. Finally, the host operating software program refers to any suitable host or central control operating system such as WINDOWS™ software by Microsoft or UNIX™ system software by AT&T, both written specifically for the given microprocessor so that the latter can operate in the virtual operating mode described above. While the present invention will be described hereinafter in relation to the Intel 386 (and 486™) and 8086 microprocessors, the previously written DOS programs, and a WINDOWS or UNIX operating system, it is to be understood that the present invention is not limited to those particular microprocessors, to those previously written software programs, or to those particular central operating systems. With that understanding in mind, a brief history of the 8086 and the 386 microprocessors will immediately follow. A more detailed discussion of those microprocessors as they relate specifically to the present invention will be provided in the

DETAILED DESCRIPTION.

It can be stated, without reservation, that Intel Corporation's earlier 8086 microprocessor was so highly successful that there were many software programs written for it. However, given that this microprocessor was to be the first of a series of subsequently improved microprocessors, it did have its limitations. One in particular, although it was not necessarily considered a limitation at the time, was the inability of the microprocessor to act on more than one software program at a time. This, of course, meant that the program itself did not have to execute in a protected, paged, multi-tasking environment. However, as the technology evolved, Intel Corporation eventually developed its 386 microprocessor which, as stated previously, is capable of running a number of programs using a more sophisticated central operating system such as WINDOWS or UNIX. At the same time, the 386 microprocessor was designed to operate in a virtual 8086 operating mode that allowed multiple software programs previously written for the earlier 8086 microprocessor to be used and specifically to execute in a protected, paged, multi-tasking environment under the more sophisticated central operating system, even though those earlier software programs were not intended to execute in that manner. There were just too many earlier programs to allow them to become obsolete. Therefore, whenever changes are made to successors of the 8086 microprocessor, compatibility with earlier 8086 software is always a consideration.

While compatibility between Intel's present microprocessors and the earlier written software is, indeed, important, there are instances in which this objective compromises certain other operational aspects of the overall computer system. Such is the case in the execution of software interrupt instructions (INTn instructions). As will be discussed in more detail hereinafter, the present 386 microprocessor is designed to execute all INTn instructions using emulation software forming part of the host program in order to emulate the way in which these instructions would have executed by the earlier 8086 microprocessor. While the number of executions of these particular instructions is a relatively small percentage of the total instructions executed by means of emulation, they account for a relatively large amount of execution time. One particular solution to this problem which has been proposed heretofore is to allow all of the INTn instructions to be executed by the software program itself in conjunction with the microprocessor and its host operating program without using the emulation software, that is, without trapping the INTn instructions in the host operating program's emulation software or emulator as it may be called. Applicants have found that this previous approach does save computing time generally (for the whole system) and emulation time in particular where the particular INTn instruction is simple, for example asking for the time, or even somewhat more complex, for example printing a character. However, Applicants have also discovered that for the more highly complex INTn instructions, for example reading a file, it is more efficient to allow those particular instructions to be trapped in and executed by the emulation software.

SUMMARY OF THE INVENTION

In view of the foregoing, it is a primary object of the present invention to actually reduce the time required to execute INTn instructions by a computer system of the type described above.

As will be seen hereinafter, a computer system is disclosed herein including a given microprocessor, for example the 386 microprocessor, which is specifically designed to operate in a virtual operating mode that allows a software program, for example a DOS program previously written for an earlier designed single program microprocessor, for example the 8086 microprocessor, to execute in a protected, paged, multi-tasking environment under a particularly designed host operating software program, for example WINDOWS or UNIX. This system also includes means forming part of the given microprocessor and the host operating software program for executing INTn instructions using emulation software forming part of the host program in order to emulate the way in which the instructions would have been executed by the earlier microprocessor.

In order to reduce the time it takes for the computer system generally and the emulation software in particular to execute INTn instructions during the virtual operating mode of the computer system, means are provided for causing certain ones of the INTn instructions to be executed by means of the emulation software while allowing certain others of the INTn instructions to be executed by means of the previously written program, but not by means of the emulation software. In the specific embodiment disclosed herein, the overall system is provided with a bit map including a series of bits, one for each of the INTn instructions. Each of these bits is placed in either an emulating first state or a non-emulating second state. Means are also provided for causing all of the INTn instructions associated with the emulating first state of the bit map to be executed by means of the emulation software while allowing all of the INTn instructions associated with the non-emulating second state of the bit map to be trapped in and executed by the previously written program in cooperation with the given software in the host operating software program, but not means of the emulation software. In other words, the present invention provides for taking some but not all of the INTn instructions out of the hands of the emulator. In that way, those INTn instructions to be emulated and those that are not to be emulated can be preselected depending upon the complexity of the particular instructions so as to minimize the overall time it takes to execute all of the instructions. This is to be contrasted first with computer system including the existing 386 microprocessor which executes all INTn instructions by means of emulation and second with the previously proposed modification to the 386 system which executes none of the INTn instructions by means of emulation. The present invention provides the best of both of these approaches as regards the execution of INTn instructions.

BRIEF DESCRIPTION OF THE DRAWINGS

The present invention will be described in more detail hereinafter in conjunction with the drawings, wherein:

FIG. 1 diagrammatically illustrates certain aspects of a prior art computer system including the earlier 8086 microprocessor;

FIG. 2 is a similar view of a computer system including the earlier 386 microprocessor, specifically illustrating the way in which it executes INTn instructions by means of emulation;

FIG. 3 is diagrammatic illustration of a computer system which executes INTn instructions in accordance with the present invention; and FIG. 4 is a flow diagram depicting the way in which the computer system illustrated in FIG. 3 executes INTn instructions in accordance with the present invention.

DETAILED DESCRIPTION

Turning now to the drawings, attention is first directed to FIG. 1 which, as indicated above, is a diagrammatic illustration of certain aspects of a prior art computer system including the earlier 8086 microprocessor. The overall computer system is generally indicated by the reference numeral 10. While this particular system includes a number of components not illustrated, it is specifically shown including an 8086 microprocessor 12 having an INTn register 14, a single DOS software program 16 and a number of I/O peripherals 18, 20 and 22, for example a monitor, a disk drive and a keyboard, respectively, although the present invention is not limited to these particular I/O devices. The INTn register 14 actually communicates with an address table (not shown) containing different execution addresses depending upon the particular INTn instruction in question. In system 10 there are 256 possible INTn instructions 0–255, each being characterized by a specific operand (n) for indexing into the table. Examples of DOS interrupt vectors (n) include:

MS-DOS terminate process,
MS-DOS function dispatcher,
MS-DOS terminate address
MS-DOS Ctrl-C handler address,
MS-DOS critical-error handler address,
MS-DOS absolute disk read,
MS-DOS absolute disk write,
MS-DOS terminate and stay resident,
MS-DOS idle interrupt,
MS-DOS reserved,
MS-DOS network redirector
MS-DOS reserved
MS-DOS multiplex interrupt
MS-DOS reserved Having described computer system 10 thus far, attention is now directed to the way in which this system handles INTn instructions from software program 16. Assume, for example, that program 16 initiates INTn instruction INTn 21. The operand 21 is placed into the INTn register 14 which is used to index the address table which contains the beginning address of a particular execution routine associated with that instruction. This is done through the microprocessor hardware in conjunction with single DOS program. 16

Turning now to FIG. 2, attention is directed to a more advanced computer system which is generally indicated by the reference numeral 24. Among other differences between this system and system 10, system 24 includes the 386 microprocessor indicated at 26 and is capable of operating simultaneously on more than one software program including programs previously written for the 8086 microprocessor, although only one such program, for example, the DOS program 16, is shown. As a result of this ability to operate on multiple software programs simultaneously, and the desire to use 8086 software, the 386 microprocessor was designed to operate in a particular virtual operating mode, as stated previously, that is in an operating mode that allows 8086 programs, for example, DOS program 16, to execute in a protected, paged, multi-tasking environment under a host operating system. As also stated previously, one such host or central operating system is the previously recited WINDOWS or UNIX program which is diagrammatically depicted at 32 in FIG. 2. This program is written to include 8086 emulation software, hereinafter sometimes referred to merely as an emulator, for executing certain sensitive interrupt related instructions including specifically software interrupt instructions (INTn instructions) from the previously written program by means of the emulation software in order to emulate the way in which the instructions would have been executed by the earlier 8086 microprocessor. In this regard, system 24 includes an INTn register 34 corresponding in function to INTn register 14. While not shown, system 24 would also include I/O peripherals such as those illustrated in FIG. 1.

With computer system 24 described thus far, attention is now directed to the way in which the system handles interrupts in its virtual operating mode. Specifically, when a particular INTn instruction by one of the software programs being operated upon, for example, program 16, it is delivered to register 34. From there, the software interrupt instruction is trapped in the emulator of host operating program 32 and executed by means of the emulation software in order to emulate the way in which the instructions would have been executed by the earlier 8086 microprocessor 12. All INTn instructions are executed in this way. This has been found to take a disproportionate amount of the emulator's execution time considering the rather small number of INTn instructions being executed. An approach which has previously been proposed to solve this problem has been to eliminate all trappings of INTn instructions in the emulator. Thus, according to that proposal, all 256 INTn instructions are handled outside the emulator, that is, by DOS program 16 itself in conjunction with microprocessor 26 and the host operating program.

As indicated previously, while it is quite time consuming to trap and emulate all INTn instructions, it could be even more time consuming to allow software program 16 and the other corresponding programs to execute all of the INTn instructions outside the emulator. Again, this is because some of the INTn instructions may be so complex as to require the software programs in conjunction with the microprocessor and host operating program to carry out additional subroutines not required by the emulator. As will be seen immediately below, the present invention eliminates the problem.

Turning now to FIG. 3, attention is directed to a further computer system 36 and specifically one which is designed in accordance with the present invention. System 36 includes a modified 386 microprocessor 26', depicted in FIG. 3 as a 386' microprocessor. This microprocessor, like the 386 microprocessor shown in FIG. 2, is specifically designed to operate in a virtual operating mode that allows multiple previously written 8086 software programs including, for example, DOS program 16 to execute in a protected, paged, multi-tasking environment under a particularly designed host operating software program 32' having its own 8086 emulation software in the same manner as system 24. System 36 is also shown including corresponding INTn register 34 and, while not shown, includes I/O peripherals in the same manner as system 10. In addition, system 36 includes a bit map 38 containing a series of 256 bits, one for each of the 256 INTn instructions. Each bit is in either an emulating first state, designated for example by a one, or a non-emulating second state designated for example by a zero. Microprocessor 26' and host operating software program 32' are designed to cause all of the INTn instructions associated with the emulating first state to be executed by means of the emulation software while allowing all of the INTn instructions associated with the non-emulating second state to be executed by means of the previously written DOS program 16 in cooperation with the microprocessor and host operating software program, but not by means of the emulation software. Each of the other software programs corresponding to DOS program 16 may include its own bit map.

Whether a particular bit within bit map 38 is in its emulating first state or its non-emulating second state is determined by the programmer and incorporated into the host operating software program. This determination is based on the complexity of each of the INTn instructions. As a general rule, those instructions that are so complex that they would take longer to execute outside the emulator, for example disk I/O, are allowed to trap within the emulator in the same manner as system 24. On the other hand, the simpler INTn instructions can be executed outside the emulator faster than they can by means of emulation and therefore are executed by means of the previously written software system in cooperation with the microprocessor and host operating program. While this is generally the criteria for setting the various bits in bit map 38, it should be apparent that the programmer could take into account other criteria. The point of the present invention is that the programmer is given this flexibility.

Having described computer system 36 and the way in which it differs from system 24 and the previous proposal for modifying system 24, it is to be understood that the present invention is not limited to Intel Corporation's 386 microprocessor and its associated components, its 486™ microprocessor, or any related microprocessor, although the present invention is especially applicable to such microprocessors. Moreover, it should be apparent from the foregoing that the present invention relates specifically to the handling of INTn instructions and that only those features have been described. Obviously, each of the systems illustrated includes other components not pertinent to the present invention. Those components and any component not shown but necessary to the way in which the systems operate to handle INTn instructions would be obvious to one with ordinary skill in the art.

Having described the way in which computer system 36 handles INTn instructions and its advantages over the prior art and the previously proposed system, attention is directed to FIG. 4. This figure depicts a flow chart of the way in which system 36 selectively handles INTn instructions in the manner described previously. In view of this particular flow chart and the teachings herein, one with ordinary skill in the art could readily practice the invention.

Turning now to FIG. 4, a flow chart is illustrated there, depicting the way in which computer system 36 shown in FIG. 3 handles INTn instructions in accordance with the present invention, while the flow chard should be self-explanatory, a brief description will be provided here. As seen there, the first decision to be made for a particular INTn instruction is to determine from the bit map if "n" has been assigned a 1 or a 0. If "n" is a 1, then the instruction is executed by means of emulation and the process ends. If "n" is a 0, then the instruction is executed by the microprocessor (including its microcode) as in the 8086 processor and the process ends.

What is claimed is:

1. A microprocessor comprising:
   means for executing instructions including an INTn instruction;
   means for accessing a bit in a bitmap structure in response to said INTn instruction, said means for executing instructions to execute an interrupt emulation routine in response to said INTn instruction if said bit is in a first state and to execute a non-emulating interrupt handling routine in response to said INTn instruction if said bit is in a second state.

2. The microprocessor of claim 1 further comprising an INTn register, wherein said microprocessor is capable of determining an execution address based on a value of an operand to said INTn instruction which is stored in said INTn register.

3. The microprocessor of claim 1 wherein said microprocessor is capable of determining an execution address based on a value of an operand to said INTn instruction.

4. The microprocessor of claim 1 wherein said bitmap structure is associated with a task and wherein an operand of said INTn instruction indexes into said bitmap structure to designate handling of said INTn instruction.

5. A microprocessor comprising:
execution means for executing an interrupt instruction (INTn) having an operand (n) to designate one of a plurality of interrupts;
means for causing certain ones of said plurality of interrupts to be handled by means of software emulation while allowing certain others of the plurality of interrupts to be executed by means of a previously written program and not by emulation.

6. The microprocessor of claim 5 further comprising an INTn register, wherein said microprocessor is capable of determining an execution address based on a value of an operand to an INTn instruction which is stored in said INTn register.

7. The microprocessor of claim 5 wherein said microprocessor is also capable of determining an execution address based on the operand.

8. The microprocessor of claim 5 wherein said means for causing includes logic to access a bitmap, wherein said bitmap is associated with a task and wherein an operand of an INTn instruction indexes into said bitmap to designate handling of said INTn instruction.

9. A microprocessor comprising:
an execution unit to execute instructions including an interrupt instruction, which is an INTn interrupt instruction having an operand specifying an interrupt number;
logic to, in response to said interrupt instruction and said interrupt number, access a table including a bit corresponding to said interrupt number, and in response to said bit being in a first state to execute an emulation routine and in response to said bit being in a second state to execute a non-emulating interrupt handling routine.

10. The microprocessor of claim 9 further comprising an INTn register, wherein said microprocessor is also capable of determining an execution address based said interrupt number which is stored in said INTn register.

11. The microprocessor of claim 9 wherein said microprocessor is also capable of determining an execution address based on a value of the operand to said interrupt instruction.

12. The microprocessor of claim 11 wherein said microprocessor is designed to operate in a virtual operating mode that allows previously written programs to operate in a protected, paged, multi-tasking environment.

13. The microprocessor of claim 9 wherein said microprocessor is to operate in a virtual operating mode.

14. The microprocessor of claim 13 wherein said microprocessor is to execute in a protected, paged, multi-tasking environment.

15. The microprocessor of claim 9 wherein said table comprises a series of 256 bits, one for each of 256 INTn instructions.

16. The microprocessor of claim 9 wherein said table is associated with a specific task.

17. The microprocessor of claim 16 wherein for each of a plurality of tasks, a different associated table is to be consulted by the microprocessor, and wherein said different associated table is indexed into based on an operand of the interrupt instruction.

18. The microprocessor of claim 17 wherein said interrupt instruction is part of a program, and wherein if said bit is a logical '1', then said microprocessor is to perform execution of an interrupt routine as in an 8086 microprocessor according to the program and wherein if said bit is a logical '0', then said microprocessor is to trap said interrupt instruction for emulation.

19. The microprocessor of claim 16 wherein a plurality of DOS programs each has an associated table.

20. The microprocessor of claim 9 wherein said table is associated with a software program.

21. The microprocessor of claim 9 wherein said interrupt instruction is part of a program, and wherein if said bit is a logical '1', then said microprocessor is to perform execution of an interrupt routine as in an 8086 microprocessor according to the program and wherein if said bit is a logical '0', then said microprocessor is to trap said interrupt instruction for emulation.

22. The microprocessor of claim 9 wherein said interrupt instruction is part of a program, and wherein if said bit is a logical '1', then said microprocessor is to perform execution of an interrupt routine according to the program and wherein if said bit is a logical '0', then said microprocessor is to trap said interrupt instruction for emulation.

* * * * *